(12) United States Patent
Pintus

(10) Patent No.: US 10,092,919 B2
(45) Date of Patent: Oct. 9, 2018

(54) DETECTION OF THE PRESENCE OF A PRODUCT SPRAYED ONTO A SURFACE

(71) Applicant: Nemera La Verpillière S.A.S., La Verpilliere (FR)

(72) Inventor: Pierre Pintus, Saint-Quentin-Fallavier (FR)

(73) Assignee: Nemera La Verpillière S.A.S. (FR)

( * ) Notice: Subject to any disclaimer, the term of this patent is extended or adjusted under 35 U.S.C. 154(b) by 0 days.

(21) Appl. No.: 15/593,770

(22) Filed: May 12, 2017

(65) Prior Publication Data

US 2017/0326562 A1 Nov. 16, 2017

(30) Foreign Application Priority Data

May 12, 2016 (FR) ..................................... 16 54261

(51) Int. Cl.
| | |
|---|---|
| *B05B 9/00* | (2006.01) |
| *B05B 12/10* | (2006.01) |
| *G01J 5/10* | (2006.01) |
| *G01J 5/00* | (2006.01) |
| *B65D 83/54* | (2006.01) |

(52) U.S. Cl.
CPC .............. *B05B 9/002* (2013.01); *B05B 12/10* (2013.01); *G01J 5/0003* (2013.01); *G01J 5/10* (2013.01); *B65D 83/54* (2013.01); *G01J 2005/0077* (2013.01); *G01J 2005/0081* (2013.01); *G01J 2005/0085* (2013.01)

(58) Field of Classification Search
CPC .. B05B 9/002; B05B 12/10; G01J 5/10; G01J 2005/0077; G01J 2005/0081
See application file for complete search history.

(56) References Cited

U.S. PATENT DOCUMENTS

| | | | |
|---|---|---|---|
| 2004/0209001 A1* | 10/2004 | Anderson ........... | B05B 13/0242 427/446 |
| 2006/0228465 A1* | 10/2006 | Zurecki ................. | C21D 1/613 427/8 |
| 2009/0101669 A1 | 4/2009 | Hassler, Jr. et al. | |
| 2015/0159349 A1 | 6/2015 | Horton | |

* cited by examiner

*Primary Examiner* — Mark R Gaworecki
(74) *Attorney, Agent, or Firm* — St. Onge Steward Johnston & Reens, LLC

(57) ABSTRACT

A method of detecting the presence of a product sprayed onto an application surface, in which the product to be applied to the application surface is sprayed onto a target zone of the application surface in pulses. Before spraying the product it is heated to a temperature higher than a predetermined temperature value. After spraying the product, a value of a parameter representing the temperature of the target zone is measured remotely, and the value of that parameter is compared to a reference value of that parameter. A detection installation including pulsed spraying by way of forming part of a device shared with the heating element.

16 Claims, 2 Drawing Sheets

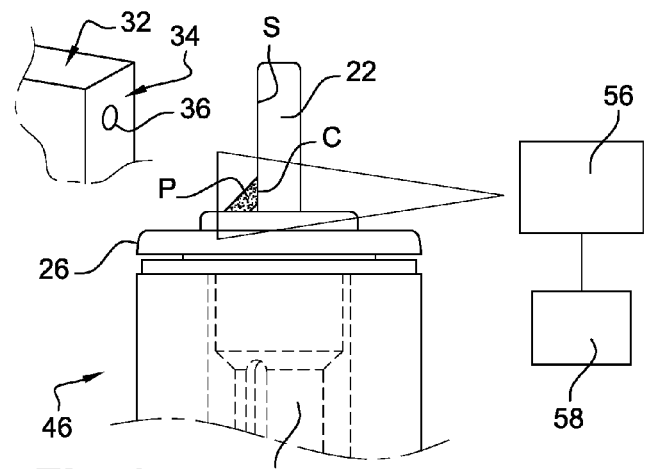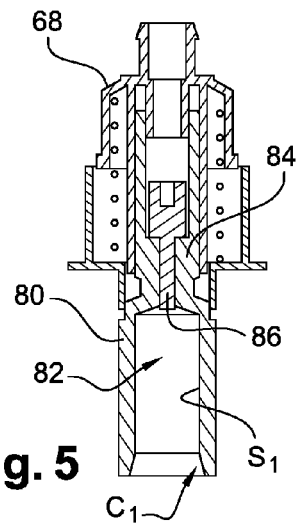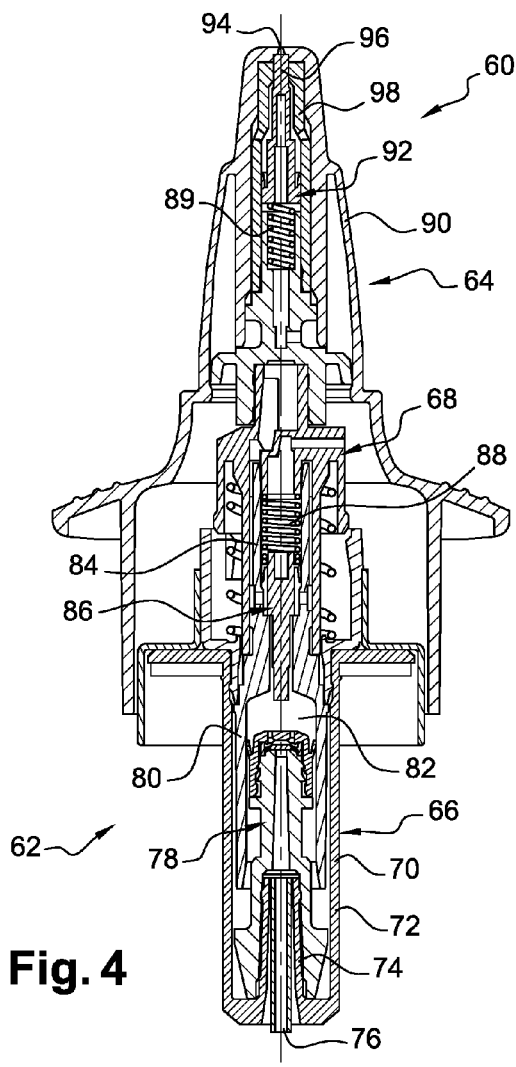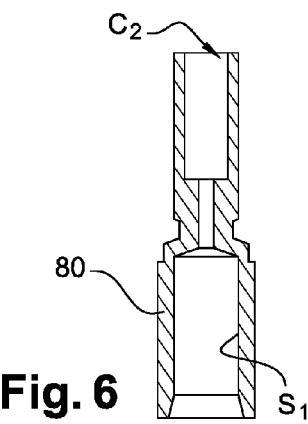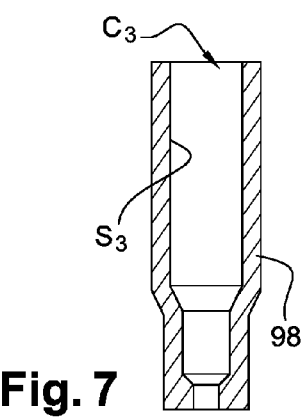

DETECTION OF THE PRESENCE OF A PRODUCT SPRAYED ONTO A SURFACE

FIELD OF THE INVENTION

The invention concerns the field of detecting the presence of a product sprayed onto a surface.

BACKGROUND OF THE INVENTION

It more particularly concerns methods of detecting the presence of a lubricant sprayed onto the surface of a component designed to slide inside another component.

When it is necessary to apply a small quantity of lubricant to a surface of difficult access and/or of small size, for example between two components of small size, it is preferably applied by spraying it in order to control its application.

Now it is important, when a lubricant is applied to a surface by spraying it, to be sure that the lubricant has indeed reached the zone, termed the target zone, of that surface to which it is required to apply the lubricant.

In fact, because of its application by spraying, the lubricant may not reach the target zone. This can happen if spraying is effected at too great a distance from the target zone or if the spraying means are obstructed.

In some circumstances it can also happen that it is only detected at a very late stage that the lubricant has not been applied correctly to the target zone, notably when the target zone is part of an assembly necessitating a plurality of assembly steps. This detection can nevertheless be achieved by visual inspection by an operative. However, visual inspection represents a non-negligible cost and necessitates the operative being close to the target zone, which is not always feasible in an automated environment.

For example, if the lubricant is applied in the context of the assembly of a device such as a metering valve for dispensing a pharmaceutical product, it can happen that it is not noticed that the lubricant has not been applied to the target zone before the final phases of testing the fully assembled device. This leads to rejecting the device very late in the process of manufacturing the device, generating loss of time and profit.

SUMMARY OF THE INVENTION

An object of the invention is therefore to detect effectively the presence of a product sprayed onto a surface.

To this end, the invention consists in a method of detecting the presence of a product sprayed onto an application surface, in which:

a dose of the product to be applied to the application surface is sprayed onto a target zone of the application surface, characterized in that:

before spraying the product it is heated to a temperature higher than a predetermined temperature, after spraying the product a value of a parameter representing the temperature of the target zone is measured remotely, and the value of that parameter is compared to a reference value of that parameter.

Thanks to the fact that the product is heated before spraying it, for example to a temperature between 41 and 80° C. inclusive, preferably 70° C., it is possible to detect its presence on the target zone by measuring the value of a parameter representing the temperature of the target zone.

In fact, if the product is indeed present on that target zone, its temperature and/or the increase in the temperature of the target zone caused by the presence of the product after it is sprayed can be detected. If the product is absent from the target zone, on the other hand, the temperature of the target zone will remain the same after spraying the product. Moreover, this method enables remote detection of the product, which proves particularly useful when the target zone is difficult of access, and/or prevention of all risk of bacterial contamination as when using contact detection means.

The value of the parameter is advantageously measured with the aid of remote measuring means of infrared video camera, pyrometer or infrared scanner type.

The remote measuring means are advantageously adapted to capture a thermographic image of the product received by the target zone and that thermographic image is advantageously processed and analysed with the aid of image processing means to quantify the quantity of the product received by the target zone.

In order better to control the quantity of the product sprayed onto the application surface, a dose of the product is advantageously formed by at least one pulse of the product spraying means.

The reference value of the parameter is preferably that of a parameter representing the temperature of the target zone of the application surface before spraying the product or representing the environment in which the target zone is situated during the remote measurement of the value of the parameter or a predefined temperature value. That temperature is for example between 15° C. and 40° C. inclusive, preferably 23° C.

The product is preferably heated to a temperature between 41° C. and 80° C. inclusive, preferably 70° C.

In one particular embodiment of the invention, the product sprayed is a lubricant, for example silicone.

In one particular embodiment of the invention, the application surface is that of a pharmaceutical product dispensing dosing valve stem.

In one particular embodiment of the invention, the application surface is that of a pharmaceutical product spraying tip intended to be connected to a pump for aspirating and dispensing that product or that of an element of a pharmaceutical product aspiration and dispensing pump.

The invention also concerns an installation for detecting the presence of a product sprayed onto an application surface, comprising:

spraying means adapted to spray onto a target zone of the application surface a dose of the product to be applied to the application surface, characterized in that it further comprises:

heating means adapted to heat the product before it is sprayed to a temperature higher than a predetermined temperature;

remote measuring means adapted to measure a value of a parameter representing the temperature of the target zone after the product has been sprayed, and means for comparing the value of that parameter to a reference value of that parameter.

The installation advantageously comprises thermographic type remote measuring means adapted to capture a thermographic image of the product received by the target zone and image processing means adapted to extract from the thermographic image of the product information on the quantity of the product received by the target zone.

In order to better control the quantity of the product sprayed onto the application surface, the spraying means advantageously comprise pulsed product spraying means, the dose of the product being formed by at least one pulse of those pulsed spraying means.

In order for the installation to be more compact, the heating means and the spraying means advantageously form part of a common device carried by an adjustable support.

BRIEF DESCRIPTION OF THE DRAWINGS

The invention will be better understood on reading the following description of the appended figures, which are provided by way of nonlimiting example, in which:

FIG. 3 is a view from the front of a detail III from FIG. 2;

FIG. 4 is a sectional view of a pharmaceutical product aspiration and dispensing pump;

FIGS. 5 to 7 are sectional views of various components of the pump from FIG. 4.

DETAILED DESCRIPTION OF THE INVENTION

Hereinafter the terms "horizontal" and "vertical" are by way of example and not by way of limitation.

Figure 1:
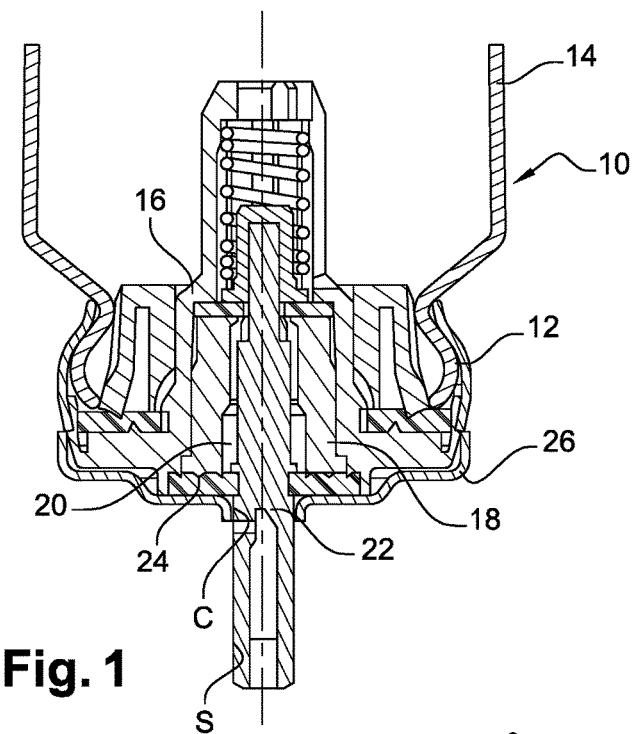
FIG. 1 is a sectional view of a pharmaceutical product dispensing metering valve.

FIG. 1 shows a pharmaceutical product dispensing metering valve 10 of circular general shape mounted on a neck 12 of a container 14. The container 14 contains a fluid to be dispensed in aerosol form, very particularly a pharmaceutical product.

The metering valve 10 comprises a valve body 16 of circular general shape including a housing to receive a reduction ring 18 delimiting a metering chamber 20 in the valve body 16.

A valve stem 22 is mounted in the reduction ring 18 to slide axially and therefore in the metering chamber 20.

The seal between the metering chamber 20 and the outside of the valve body 16 is provided by a first annular seal 24 termed the internal seal. The internal seal 24 is interleaved axially between the valve stem 22 and a valve cup 26 crimped onto the neck 12 of the container 14. The valve stem 22 slides in sealed manner through the internal seal 24 which also contributes to guiding it axially.

It is intended to distribute a lubricant such as silicone onto a target zone C of an application surface S of the valve stem 22 in order to ensure that the valve stem 22 slides easily in the metering chamber 20 without excessive rubbing on the internal seal 24 during the manufacture of the metering valve 10.

Here the target zone C is a zone of the surface of the valve stem 22 situated at the junction between the valve stem 22 and the valve cup 26 at the free end of the valve stem 22 (at the bottom in FIG. 1) that will be the only end accessible once the valve stem 22 is mounted in the valve body 16.

Figure 2:
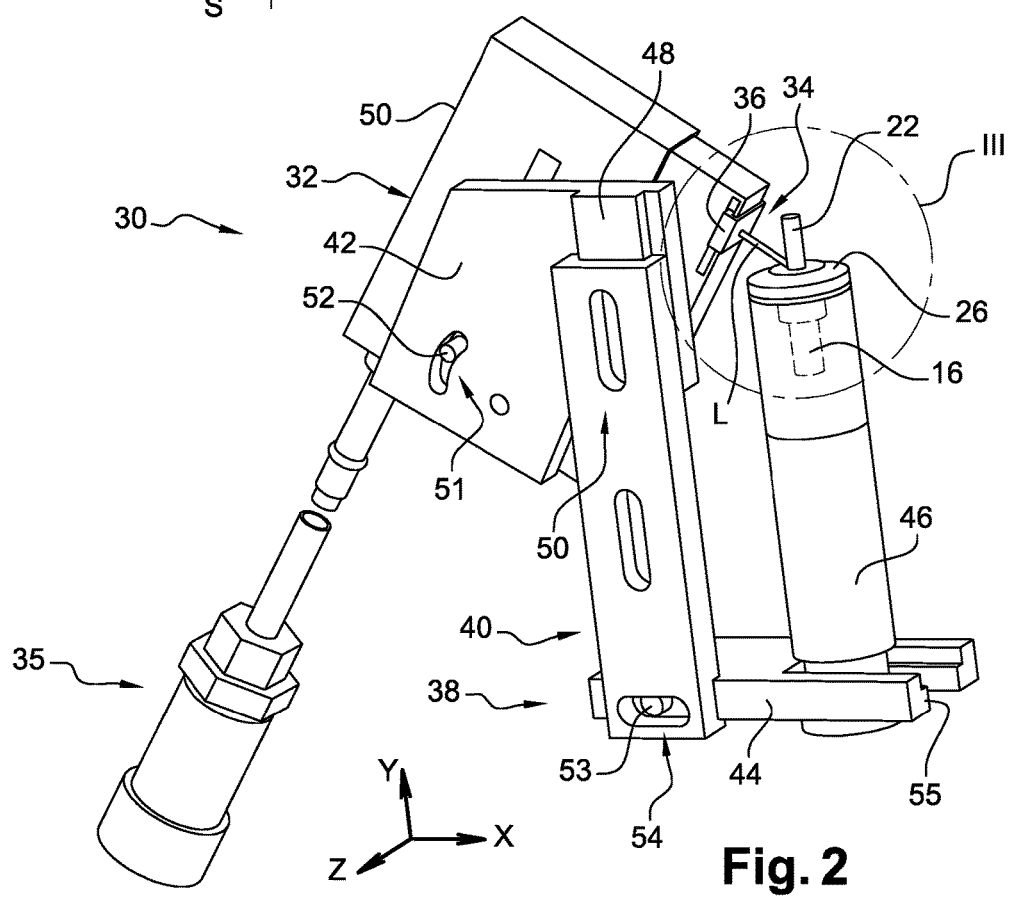
FIG. 2 is a perspective view of a detection installation according to one particular embodiment of the invention.

FIG. 2 shows an installation 30 in accordance with one particular embodiment of the invention for detecting the presence of a product sprayed onto a surface.

The installation 30 comprises a spraying device 32 comprising spraying means 34 adapted to spray onto the target zone C (seen in FIG. 3) of the application surface S of the valve stem 22 a dose of the product P to be applied to the application surface S together with classic heating means (not seen in FIG. 2) adapted to heat the product P before it is sprayed to a temperature higher than a predetermined temperature $T_C$.

The spraying device 32 includes for this purpose means 35 for feeding the product P.

Given the application referred to above, in the example shown the sprayed the product P is silicone, which is a lubricant suitable for devices for dispensing pharmaceutical products.

Here the heating and spraying means form part of the same spraying device 32, which is common to them, enabling the installation 30 to be made more compact. It is for example a device marketed under the trademark PICO® by the company Nordson EFD.

In particular, the spraying means 34 comprise pulsed product spraying means, the dose of the product P being formed by at least one pulse of those spraying means 34. The product P is preferably ejected via a spraying nozzle 36. The trajectory of the product P ejected in this way is represented by the line L in FIG. 2.

The spraying device 32 is carried by an adjustable support 38 enabling adjustment of the position of the spraying device 32 relative to the target zone C. The adjustable support 38 comprises a support pillar 40 to which is connected at a first end a first member 42 for adjustment of the position of the spraying device 32 and at a second end a second member 44 for adjusting the position of an application surface support member 46.

The first adjustment member 42 carries the spraying device 32 and the second adjustment member 44 carries the support member 46.

The first adjustment member 42 is mounted to slide on the support pillar 40 by way of an element 48 sliding on a rail 50 situated at one end of the support pillar 40 which enables adjustment of the position of the spraying device 32 along a vertical axis Y.

Moreover, the first adjustment member 42 comprises a curved opening 51 guiding a lug 52 of the spraying device 32 along a curved guide path.

This enables adjustment of the jet angle of the product P, more specifically the orientation of the spraying nozzle 36 about a horizontal axis Z orthogonal to the spraying direction.

The second adjustment member 44 also comprises an adjustment finger 53 sliding in a straight opening 54 situated at the opposite end of the support pillar 40 comprising the rail 50. This enables adjustment of the position of the second adjustment member 44 along an axis X and therefore adjustment of the distance between the support pillar 40 and the support member 46. The support member 46 is for example mounted to slide in a fork 55 of the second adjustment member 44.

In order to spray the product P accurately onto the application surface S of the valve stem 22 the valve body 16 is disposed on the support member 46 so that it faces the spraying nozzle 36.

As can be seen in FIG. 3, the installation 30 further comprises distance measuring means 56 adapted to measure a value of a parameter T representing the temperature of the target zone C after the product P has been sprayed.

These remote measuring means 56 comprise for example an infrared video camera, a pyrometer, an infrared scanner. They can be coupled to laser, optical or reflex aiming means enabling optimum positioning of the remote measuring device 56 to target accurately the zone for measuring the value of the parameter T.

When the remote measuring means 56 are of infrared type, the value of the parameter T can for example be a pixel colour value of a thermographic image representing the waves of the infrared rays emitted by the target zone C. The parameter T can equally be a wavelength of infrared rays emitted by the target zone C or directly the temperature of the target zone C.

The installation 30 also comprises means 58 for comparing the value of this parameter T to a reference value $T_R$ of this parameter T.

The reference value $T_R$ is for example that of a parameter representing the temperature of the target zone C of the application surface S before spraying the product P. Alternatively, this reference value $T_R$ is that of the environment in which the target zone C is situated when remotely measuring the value of the parameter T or a predefined temperature value, for example between 15° C. and 50° C. inclusive, preferably 23° C.

In the particular embodiment shown in the figures, the product P to be sprayed being silicone, it is preferably heated to a heating temperature $T_C$ between 41° C. and 80° C. inclusive, preferably 70° C. In fact, heating silicone to this kind of temperature enables it to be rendered less viscous and there to be sprayed more easily.

The installation 30 can finally comprise thermographic type remote measuring means 56 adapted to capture a thermographic image of the product P received by the target zone C and image processing means adapted to extract from the thermographic image of the product P information on the quantity of the product P received by the target zone. The image processing means are preferably coupled to the remote measuring means 36 and, in known manner, enable processing to analyse the thermographic image captured by the remote measuring means 56 to quantify the quantity of the product P received by the target zone C, notably by measuring areas.

Therefore, with the aid of these image processing means, an area occupied by the applied the product P is determined and the quantity of the product P received by the application surface S deduced from this. This deduction is for example obtained by means of a predefined correspondence table. The correspondence table is for example constructed by successively associating an image of the product P on the target zone C and the corresponding weight of the product P, the weight difference of the assembly including the target zone C before and after application of the product P enabling determination of the weight of the product P deposited. The weight can be measured with the aid of a precision balance.

A method according to the invention of detecting the presence of a product P sprayed onto a surface S will now be described with reference to FIG. 3.

Before spraying the product P, it is heated to a temperature higher than a predetermined temperature $T_C$ with the aid of heating means.

A dose of the product P is then sprayed onto the target zone C of the application surface S with the aid of the spraying means 34. That dose corresponds to one pulse of the spraying means 34, for example.

After the product P has been sprayed, a value of a parameter T representing the temperature of the target zone C is remotely measured with the aid of the remote measuring means 56.

The value of this parameter T is then compared to a reference value $T_R$ of this parameter T with the aid of the comparison means 58.

This comparison can be done by an operative or by a computer program, comparing the colour of pixels of an image representing the infrared rays emitted by the target zone C with the colour of the pixels of the image of the target zone C before spraying the product P. Alternatively, the value of the wavelength of the infrared rays emitted by the target zone C after and before spraying are compared by an operative or a computer program. The value of the parameter T could equally be compared to a reference value $T_R$ that is a predefined threshold value.

In another embodiment of the invention the surface S onto which the product P is sprayed is that of a pharmaceutical product spraying tip intended to be connected to a pump for aspiration and dispensing of that product P or that of an element of a pharmaceutical product aspiration and dispensing pump.

Thus FIG. 4 shows a product delivery device 60 comprising a pump 62 surmounted by an tip 64 for dispensing the product. The device 60 is used for pharmaceutical product nasal sprays, for example. This pump 62 is intended to be mounted on a container (not shown in FIG. 4).

The pump 62 comprises a first part 66, termed the fixed part, and a second part 68, termed the mobile part or dispensing head and mobile relative to the fixed part 66.

The fixed part 66 of the pump 62 preferably includes a pump body 70 comprising an exterior cylinder 72 connected to an interior cylinder 74 receiving a dip tube 76. The dip tube 76 is immersed in the container when the pump 62 is mounted at the top in order to take up the product to be delivered. The pump body 70 carries a piston 78 mounted on the interior cylinder 74.

The mobile part 68 of the pump 62 comprises a first cylinder 80 mounted to slide inside the pump body 70 and delimiting with the piston 78, to be more precise with a pressing element 81, a metering chamber 82. In other words, the piston 78 is mounted to slide in the first cylinder 80 and therefore in the metering chamber 82.

The mobile part 68 moreover includes a second cylinder 84 made in one piece with the first cylinder 80. A first needle 86 is mounted to slide inside this second cylinder 84 between a rest position and an activated position when acted on by first return means 88 consisting of a compressed spring.

The application surface $S_1$, visible in FIGS. 5 and 6, onto which a product P is sprayed in accordance with the invention can be the surface of the internal wall of the first cylinder 80.

To enable easy sliding of this piston 78 in the first cylinder 80, the aim in particular is to reach the target zone $C_1$, visible in FIG. 5, situated at the end of the first cylinder 80 in which the piston 78 slides.

The aim is also to lubricate the zone $C_2$, visible in FIG. 6, situated at the end of the first cylinder 80 in which the needle 86 slides, to enable easy sliding of this needle 86 in the first cylinder 80.

The dispensing tip 64 moreover comprises an envelope 90 comprising a pipe 92 leading in its upper part to a spraying orifice 94 of small diameter. A needle 96 inserted in a vortex chamber 98 of the pipe 92 and loaded by second return means 89 forms a dispensing valve.

The application surface $S_3$, visible in FIG. 7, onto which a product P is sprayed in accordance with the invention can also be the surface of the internal wall of the vortex chamber 98.

The aim is in particular to reach the target zone $C_3$, visible in FIG. 7, situated at the end opposite the spraying orifice 94 of the vortex chamber 98 to enable easy sliding of the needle 96 in the vortex chamber 98.

Generally speaking, the invention is not limited to the embodiments described and other embodiments will be clearly apparent to the person skilled in the art.

The detection method according to the invention can in fact be applied in the framework of spraying products other than a lubricant, for example glue, paint, ink, etc.

The surfaces to which the product is applied are moreover not limited to the surfaces of pharmaceutical product dispensing devices. They can be any other surface intended to receive the sprayed product.

What is claimed is:

1. A method of detecting the presence of a product sprayed onto an application surface, in which:
    a dose of the product to be applied to the application surface is sprayed onto a target zone of the application surface,
    characterized in that:
    before spraying the product, the product is heated to a temperature higher than a predetermined temperature,
    after spraying the product, a value of a parameter representing the temperature of the target zone is measured remotely with the aid of remote measuring device, and
    the value of that parameter is compared to a reference value of that parameter,
    wherein the remote measuring device captures a thermographic image of the product received by the target zone and in which that thermographic image is processed and analyzed with the aid of an image processor to quantify the quantity of the product received by the target zone.

2. The detection method according to claim 1, in which the reference value of the parameter is that of a parameter representing the temperature of the target zone of the application surface before spraying the product or representing the environment in which the target zone is situated during the remote measurement of the value of the parameter or a predefined temperature value.

3. The detection method according to claim 1, in which the product sprayed is a lubricant.

4. The detection method according to claim 3, in which the product sprayed is silicone.

5. The detection method according to claim 1, in which the application surface is that of a pharmaceutical product dispensing dosing valve stem.

6. The detection method according to claim 1, in which the application surface is that of a pharmaceutical product spraying tip connectable to a pump for aspirating and dispensing that product or that of an element of a pharmaceutical product aspiration and dispensing pump.

7. The detection method according to claim 1, in which the remote measuring device is one of an infrared video camera, a pyrometer, or an infrared scanner.

8. A method of detecting the presence of a product sprayed onto an application surface, in which:
    a dose of the product to be applied to the application surface is sprayed by a product spraying device onto a target zone of the application surface,
    characterized in that:
    before spraying the product, the product is heated to a temperature higher than a predetermined temperature,
    after spraying the product, a value of a parameter representing the temperature of the target zone is measured remotely, and
    the value of that parameter is compared to a reference value of that parameter,
    wherein a dose of the product is formed by at least one pulse of the product spraying device.

9. The detection method according to claim 8, in which the reference value of the parameter is that of a parameter representing the temperature of the target zone of the application surface before spraying the product or representing the environment in which the target zone is situated during the remote measurement of the value of the parameter or a predefined temperature value.

10. The detection method according to claim 8, in which the product sprayed is a lubricant.

11. The detection method according to claim 8, in which the application surface is that of a pharmaceutical product dispensing dosing valve stem.

12. The detection method according to claim 8, in which the application surface is that of a pharmaceutical product spraying tip connectable to a pump for aspirating and dispensing that product or that of an element of a pharmaceutical product aspiration and dispensing pump.

13. An installation for detecting the presence of a product sprayed onto an application surface, comprising:
    a spraying device to spray onto a target zone of the application surface a dose of the product to be applied to the application surface,
    a heating element to heat the product before the product is sprayed to a temperature higher than a predetermined temperature;
    a remote measuring device to measure a value of a parameter representing the temperature of the target zone after the product has been sprayed,
    a processor for comparing the value of that parameter to a reference value of that parameter, and
    a thermographic type remote measuring device capturing a thermographic image of the product received by the target zone and an image processor extracting from the thermographic image of the product information on the quantity of the product received by the target zone.

14. The detection installation according to claim 13, in which the spraying device is a pulsed product spraying device, the dose of the product being formed by at least one pulse of the pulsed spraying device.

15. The detection installation according to claim 13, in which the application surface is that of a pharmaceutical product dispensing dosing valve stem.

16. The detection installation according to claim 13, in which the application surface is that of a pharmaceutical product spraying tip connectable to a pump for aspirating and dispensing that product or that of an element of a pharmaceutical product aspiration and dispensing pump.

* * * * *